United States Patent [19]
Falcoff

[11] Patent Number: 5,558,249
[45] Date of Patent: Sep. 24, 1996

[54] PRECISION LIQUID ADDITION DEVICE

[75] Inventor: Allan F. Falcoff, Chadds Ford, Pa.

[73] Assignee: E. I. Du Pont de Nemours and Company, Wilmington, Del.

[21] Appl. No.: 306,426

[22] Filed: Sep. 19, 1994

Related U.S. Application Data

[63] Continuation-in-part of Ser. No. 57,034, May 5, 1993, abandoned.

[51] Int. Cl.$^6$ ................................................. B67D 5/08
[52] U.S. Cl. ........................ 222/63; 222/145.1; 222/318
[58] Field of Search ........................... 222/144.5, 148, 222/318, 424, 63, 255, 145.1

[56] References Cited

U.S. PATENT DOCUMENTS

| | | | |
|---|---|---|---|
| 3,979,021 | 9/1976 | Reinecke | 221/1 |
| 4,004,717 | 1/1977 | Wanake | 222/255 |
| 4,195,527 | 4/1980 | Ebeling et al. | 73/434 |
| 4,288,230 | 9/1981 | Ebeling et al. | 23/230 |
| 4,365,728 | 12/1982 | Tokorozawa et al. | 222/209 |
| 4,399,104 | 8/1983 | Coblenz et al. | 422/111 |
| 4,433,795 | 2/1984 | Maiefski et al. | 222/14 |
| 4,456,149 | 9/1984 | Sciortino | 222/1 |
| 4,475,666 | 10/1984 | Bilbrey et al. | 222/14 |
| 4,494,677 | 2/1985 | Falcoff | 222/63 |
| 4,628,750 | 12/1986 | Wilker | 73/864.63 |
| 4,796,787 | 1/1989 | Tsuyuki | 222/64 |
| 4,941,596 | 7/1990 | Marty et al. | 222/144 |
| 5,062,547 | 11/1991 | Zahner et al. | 222/144.5 |
| 5,074,154 | 12/1991 | Allen et al. | 73/864.34 |
| 5,174,474 | 12/1992 | Tammi et al. | 222/94 |
| 5,228,594 | 7/1993 | Aslin | 222/63 |
| 5,238,147 | 8/1993 | Yasui et al. | 222/1 |
| 5,271,521 | 12/1993 | Noss et al. | 222/1 |

FOREIGN PATENT DOCUMENTS

91/10551  7/1992  WIPO.

*Primary Examiner*—Andres Kashnikow
*Assistant Examiner*—Philippe Derakshani
*Attorney, Agent, or Firm*—Rodney B. Carroll

[57] ABSTRACT

An apparatus for delivering an accurate volume of fluid from a supply vessel to a process vessel or system in which a computer-controlled servo motor and pump are connected with a modified sampling valve with plunger-type injection device to allow complete addition of all metered fluids. The apparatus is particularly useful for addition of pH or viscosity control additives or shading colorants wherein the delivery of small volumes with precision is desired.

8 Claims, 1 Drawing Sheet

PRECISION LIQUID ADDITION DEVICE

CROSS-REFERENCE TO RELATED APPLICATION

This application is a continuation-in-part application of Ser. No. 08/057,034, filed May 5, 1993 now abandoned.

BACKGROUND OF THE INVENTION

This invention is related to an apparatus that is capable of delivering an accurate quantity of fluids to a process vessel or process system.

In many formulation applications, small amounts of fluids must be added during the manufacturing process. For example, in custom making of paint, an unpigmented resin solution or dispersion is blended with one or more mill bases which contain dispersed pigments, a liquid carrier and a dispersing resin. To achieve a color match of the paint being made to a standard color, accurate amounts of fluids and dispersions must be added, often in vex), small amounts. The slightest deviation from the formula results in off-color paint. Therefore, accurate delivery equipment is required.

Another example is where ingredients are added to achieve a material within a specific tolerance range of pH and/or viscosity limits. Again, precise control of additions in small quantities is essential, particularly for materials which are sensitive to fluctuations in pH or viscosity.

A typical apparatus which was used for precision pumping of fluids is shown in Cocks, U.S. Pat. No. 4,026,439, issued May 31, 1977 which uses a pneumatic control system. However, this control system does not control the pump accurately. Also, the disclosed liquid-activated check valves do not accurately control flow due to the failure of the valve seat to seal reliably when used with suspended pigmented solutions.

Falcoff, U.S. Pat. No. 4,494,677, issued Jan. 22, 1985 discloses an apparatus which uses a computer controlled pump to deliver fluid from a supply vessel to a mixing vessel. This disclosure does not allow for easy addition of materials to an on-line system, particularly for small amounts needed for fine adjustments of a formulation in manufacture.

An object of this invention is to allow easy and precise addition of materials to a process vessel or process system. Another object is to enable all fluids which are metered to the system are actually injected into the process vessel or stream, with no material left within the injection device.

Yet another object of the invention is to eliminate dead or empty space within the system through a recirculation mode to achieve air-free injection of variable quantities of a liquid. Once the system is filled with materials to be added, the recirculation mode may be used to resuspend materials within the fluid, such as pigments, and prevent inhomogeneity among the constituents.

Another objective of the invention is to have recirculation within the pumping systems, the injection valve and recirculation line back to a supply vessel while the piping and valving are directly connected the process line.

SUMMARY OF THE INVENTION

The apparatus disclosed allows precise addition of fluids into a process vessel or process stream to make on-line ingredient additions or adjustments using a computer controlled servo motor and a modified sampling valve which contains plunger-type injection means to allow complete addition of all metered fluids. Fluids can be directly injected into the process or into a common manifold equipped with a chaser line to ensure that all addition material is flushed into the process.

The system has a closed-loop recirculation mode controlled by computer which allows the system to be purged of entrapped air in order to ensure that all material within the system is incompressible. The material within the system can also be recirculated periodically to prevent inhomogeneity for fluids with suspended material, such as a paint dispersion which contains pigment or metallic flake.

DETAILED DESCRIPTION OF THE INVENTION

The apparatus of this invention is useful for delivering an accurate quantity of fluid from a supply vessel to a second vessel which usually is a mixing vessel. The apparatus is useful for addition of viscosity or pH control additives when mixing chemical components and is especially useful for mixing paints wherein the delivery of very small volumes with precision is essential.

Figure 1:
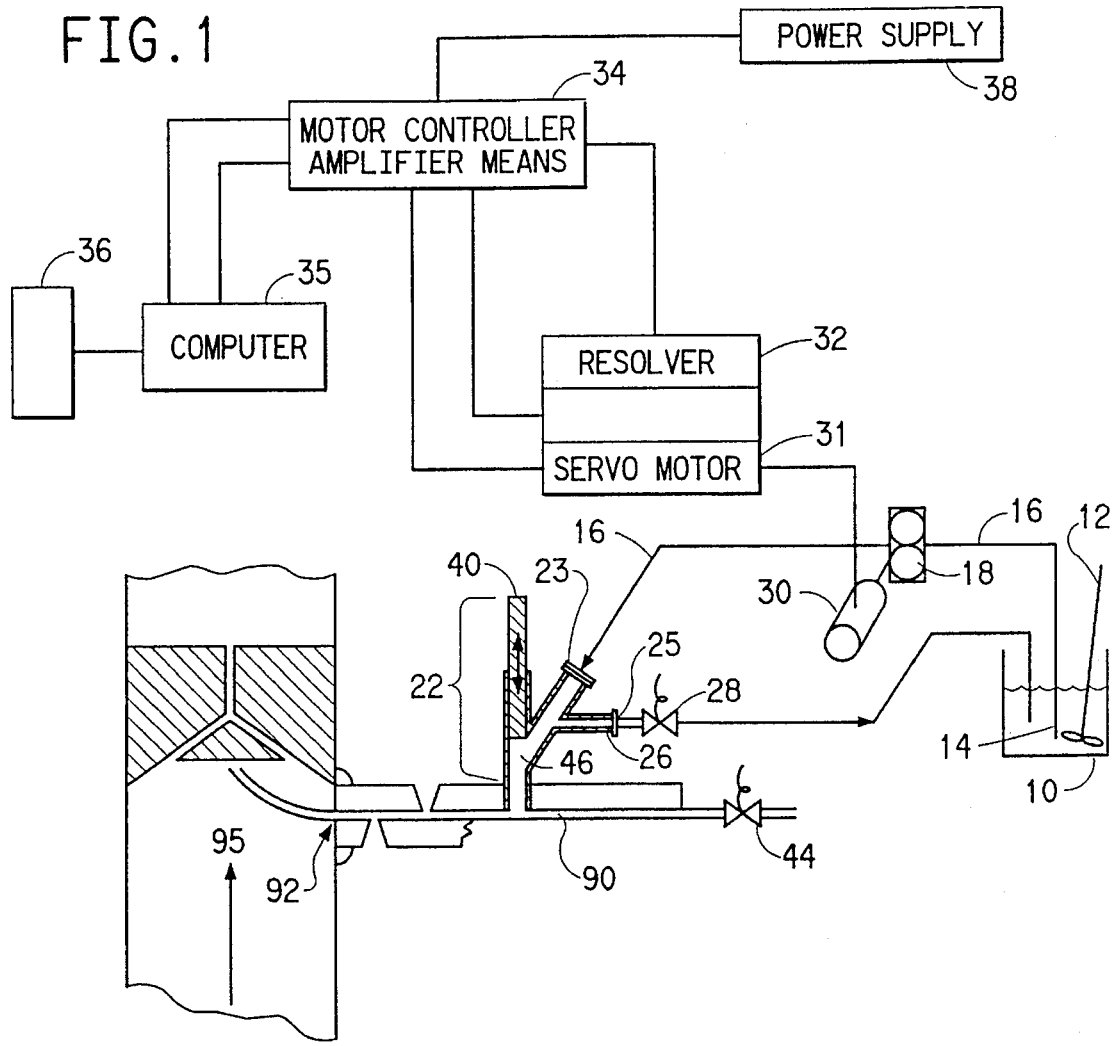
FIG. 1 is a schematic representation illustrating the major components of the apparatus of the invention.

FIG. 1 illustrates the apparatus in which an accurate volume of fluid is pumped from supply vessel 10 through injection port 22 and into product stream 95.

Supply vessel 10 contains fluids to be added to the system. Agitating means 12 may be present to ensure suspension of solids within the liquids to be dispensed, such as pigments or metallic flake. Pipe 16 is positioned within supply vessel 10 such that inlet section 14 is below the surface of the fluids within supply vessel 10. Pipe 16 is connected by ordinary means to the inlet side of positive displacement means 18, typically, a pump such as BarMag Model SV79A Gear Pump. Suitable examples of displacement means are a gear pump, piston pump or diaphragm pump.

Displacement means 18 is powered by servo motor 30, typically, an Industrial Motor, Model EB-202-A. Servo motor 30 is electrically attached to and controlled by a motor controller amplifier means 34, typically, an Industrial Drives Model BDS-5-203 Amplifier, driven by power supply 38, typically, Industrial Driver Model PSR-5-213, which is electrically coupled to computer 35. Resolver 32 connected to motor 30 measures the angular shaft rotation of motor 30 and feeds this information to motor controller amplifier means 34. Motor controller amplifier means 34 obtains rotation and velocity commands from computer 35 and signals computer 35 when the activity has been preformed.

Computer 35 is programmed to rotate servo motor 30 according to a pre-determined revolution-pump displacement relationship. Computer 35 calculates from in-process instrumentation or from programmed input the number of rotations required to pump the desired mount of fluid from supply vessel 10 into process stream 95. From a predetermined relationship of motor revolutions relative to the volume of liquid displaced, computer 35 will download to the servo controller amplifier means 34 the number of revolutions necessary for servo motor 30 to complete in order to displace the required volume of fluid.

The computer is typically a digital computer such as IBM, Intel 386-based personal computer with an input through which formulation information is fed. The input can be a standard key board or another computer.

Pipe 16 extends from positive displacement means 18 to liquid injection valve 22 mounted by ordinary means on pipe 90. Liquid injection valve 22 is, typically, Sampling Valve SV-500, Strahman Valve, Inc. which has been modified with a second liquid port 26 drilled into standard side port 23. Pipe 16 is attached to opening 25 of second liquid port 26 by ordinary means and pipe 16 returns to supply vessel 10. Automatic solenoid valve 28, typically, Quality Controls, Inc., Model SV-64-½, is mounted on pipe 16 in close proximity to second liquid injection port 26.

Liquid injection valve 22 has pneumatically controlled plunger 40, which can be positioned in either an open (up) or closed (down) position. When plunger 40 is in the open position, and solenoid valve 28 is closed, material from supply vessel 10 can enter pipe 16, be pumped through pipe 16 to enter process stream 95 through injection valve 22. Process stream 95 may be of a higher pressure than that of pipe 16. When plunger 40 is closed and solenoid valve 28 is open, a closed loop system allows fluids in supply vessel 10 to be pumped through pipe 16 without entering process stream 95. The closed-loop system enables the system to be purged of entrapped air in order to ensure that all material within the system is incompressible. Liquid injection valve 22 is air-free at all times and materials within its chambers are incompressible.

In operation, supply vessel 10 is filled with fluids to be injected into process stream 95. Agitator means 12 may used to assist in suspending solids present in such fluids, as typical in color dispersions. Computer 35 calculates the volume of fluids to be injected into process stream 95. From a predetermined relationship of motor revolutions to fluid volume displaced, computer 35 will download to servo motor control means 34 the number of motor revolutions necessary for servo motor 30 to complete. Computer 35 will signal plunger 40 to the open position and confirm that injection valve 22 is open. Computer 35 will then signal solenoid valve 28 to the closed position, confirm such closed position and start servo motor 30. Servo motor 30 will drive positive displacement means 18 the required number of revolutions to displace the desired volume of fluid. Upon completion of the pumping cycle computer 35 positions plunger 40 to the closed position. Any fluid remaining in injection port cavity 46 will be injected into pipe 90 by the downward motion of plunger 40. This allows for air-free injection of material into pipe 90 and into process stream 95. This can also be manually operated at the end of the pumping sequence.

Figure 2:
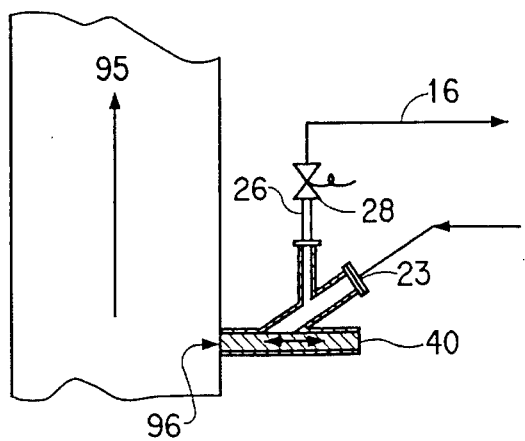
FIG. 2 is a schematic representation of a mode of direct injection.

A chaser apparatus to wash fluids remaining in pipe 90 into process stream 95 is shown in FIG. 1. Electrically controlled solenoid valve 44 is mounted by ordinary means in close proximity to injection valve 22 on pipe 90. As an alternative, manual means may be substituted for solenoid valve 44. Pipe 90 is connected to a supply of fluid, not shown, which is mutually miscible between the contents of supply vessel 10 and process stream 95, for example, deionized water. During injection, solenoid valve 44 is in a closed position. Upon completion of the injection, computer 35 directs solenoid valve 44 to an open position to allow an amount of the mutually miscible fluid to enter pipe 90 to flush any remaining fluids from supply vessel 10 out of pipe 90 and into process stream 95. Solenoid valve 44 is returned to the closed position by computer 35 after a suitable amount of time elapses. Care is taken to minimize the amount of flushing fluids entering pipe 90 so as to avoid degradation of process mixtures. A plurality of the described invention, in either a manifold or direct injection mode, can be attached to pipe 90 as to permit multiple injection options into the process stream. Materials can also be injected directly into the process stream or container in the absence of a manifold or chaser line, as seen in FIG. 2.

The system can also be in a recirculation mode. Computer 35 positions plunger 40 in a closed position to create a closed loop system. Fluids can then be pumped from supply vessel 10 through pipe 16 into modified sampling valve 23, through open solenoid valve 28 and return to supply vessel 10. Computer 35 will operate servo motor 30 for time intervals and speed levels such that sufficient volume of fluids within supply vessel 10 are pumped through the system at a velocity sufficient to displace air and resuspend any settled solids within the system, as prior to operation of the injection mode.

Recirculation can also be used to periodically cycle fluids containing suspended materials, such as paint dispersions which contain pigment or metallic flake, at sufficient velocities, such that settled pigment or solids are reincorporated into the fluid. Such recirculation will prevent inhomogeneity within the system. During such recirculation, plunger 40 being in the closed position will prevent valve cavity 40 from becoming filled or plugged with suspended materials.

Standard materials may be used to fabricate the components of the apparatus. Most components may be machined from aluminum, steel or stainless steel, depending on the properties of the fluids intended to pass through the apparatus.

When the apparatus is used in a typical paint mixing operation, all electrical equipment, such as motors, motor controller, valves and the like are modified to meet the specifications of Article 500 of The National Electrical Code for operation within electrically-classified environments.

The disclosure and description of the invention are illustrative and explanatory thereof, and various changes in the size, shape and materials, as well as the details of the illustrated construction, may be made within the scope of the appended claims and without departing from the spirit of the invention.

What is claimed is:

1. An apparatus for delivering a controlled volume of fluid from a supply vessel to a high pressure stream which comprises:

(a) at least one liquid supply vessel;

(b) a positive displacement means capable of delivering a variable volume of fluid from said supply vessel;

(c) controlling means coupled to said positive displacement means which drives said positive displacement means;

(d) a computer capable of storing programs electrically connected to said controlling means;

(e) an injection valve having three ports, wherein a first port receives fluid from said supply vessel, a second port attached to said first port allows said fluid to flow out of said injection valve into a process line and a third port which allows fluid to flow to a recirculation line;

(f) a plunger in said injection valve being positioned within said injection valve such that fluid may enter the space within said injection valve, said plunger acting as a syringe to perform air-free and complete addition of materials at the completion of the pumping cycle;

(g) a solenoid controlled by the computer to a position to allow circulation of fluids from said supply vessel through said injection valve back to said supply vessel to prevent settling of suspended particles within said fluids;

wherein said computer through the controlling means drives the positive displacement means to pump a volume of fluid from said supply vessel into said injection valve as the plunger is in the open position such that pumped fluids enter said process stream.

2. Apparatus as claimed in claim 1 wherein said computer is a digital computer having a keyboard input.

3. Apparatus as claimed in claim 1 wherein said computer has input from a second computer.

4. Apparatus as claimed in claim 1 wherein said injection valve is a sampling valve having a standard side port and a second liquid port in said standard side port.

5. Apparatus as claimed in claim 1 wherein said controlling means further comprises:

(a) a servo motor connected to said positive displacement means;

(b) a resolver connected to said servo motor for measuring angular rotation and motor speed of said positive displacement means within said servo motor; and (c) a motor controller amplifier means electrically connected to said resolver which receives a signal on angular rotation from said resolver and thereby computes motor speed to control the servo motor and output of said positive displacement means.

6. An apparatus for delivering a controlled volume of fluid from a supply vessel to a high pressure stream which comprises:

(a) at least one liquid supply vessel;

(b) a positive displacement means capable of pumping a variable volume of fluid from said supply vessel;

(c) controlling means coupled to said positive displacement means which drives said positive displacement means;

(d) a computer capable of storing programs electrically connected to said controlling means;

(e) an injection valve having three ports, wherein a first port receives fluid from said supply vessel, a second port attached to said first port allows said fluid to flow out of said injection valve into a process line and a third port which allows fluid to flow to a recirculation line;

(f) a plunger in said injection valve being positioned within said injection valve such that fluid may enter the space within said injection valve, said plunger acting as a syringe to perform air-free and complete addition of materials at the completion of the pumping cycle;

(g) a solenoid controlled by the computer to allow circulation of fluids from said supply vessel through said injection valve back to said supply vessel to prevent settling of suspended solids within said fluids;

(h) a conduit which carries fluids to flush a supply line connected to said process stream whose flow is controlled by a second solenoid controlled by said computer;

wherein said computer through the controlling means drives the positive displacement means to pump a volume of fluid from said supply vessel into said injection valve as the plunger is in the open position such that pumped fluids enter said process stream, said plunger returns to said closed position, said second solenoid opening to allow fluids from said conduit to enter.

7. Apparatus as claimed in claim 6 wherein said computer is a digital computer.

8. Apparatus as claimed in claim 6 wherein said controlling means is (a) a servo motor connected to said displacement means;

(b) a resolver connected to the motor for measuring angular rotation of displacement means within said motor; and (c) a motor controller amplifier means electrically connected to a resolver which receives a signal on angular rotation from said resolver and thereby controls the motor and output of said positive displacement means.

* * * * *